United States Patent
Carroll et al.

(10) Patent No.: US 11,962,617 B2
(45) Date of Patent: Apr. 16, 2024

(54) CROSS-CHANNEL NETWORK SECURITY SYSTEM WITH TIERED ADAPTIVE MITIGATION OPERATIONS

(71) Applicant: BANK OF AMERICA CORPORATION, Charlotte, NC (US)

(72) Inventors: Michael Joseph Carroll, Orland Park, IL (US); Jeffrey Brian Bashore, Saint Augustine, FL (US); Joel Filliben, Newark, DE (US); Andrew DongHo Kim, Glendale, AZ (US); Akhilendra Reddy Kotha, Downingtown, PA (US); Pavan Kumar Reddy Kotlo, Middletown, DE (US); Ronnie Joe Morris, Jr., Mesquite, TX (US); Dharmender Kumar Satija, Rye Brook, NY (US); Michael Shih, Cherry Hill, NJ (US); Scott Anderson Sims, Tega Cay, SC (US); Craig D. Widmann, Chandler, AZ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 390 days.

(21) Appl. No.: 17/191,377

(22) Filed: Mar. 3, 2021

(65) Prior Publication Data
US 2022/0286476 A1 Sep. 8, 2022

(51) Int. Cl.
*H04L 9/00* (2022.01)
*H04L 9/40* (2022.01)

(52) U.S. Cl.
CPC ........ *H04L 63/1466* (2013.01); *H04L 63/105* (2013.01); *H04L 63/1416* (2013.01); *H04L 63/1425* (2013.01); *H04L 63/20* (2013.01)

(58) Field of Classification Search
CPC .............. H04L 63/1466; H04L 63/105; H04L 63/1416; H04L 63/1425; H04L 63/20; G06Q 20/405; G06Q 20/4016
See application file for complete search history.

(56) References Cited

U.S. PATENT DOCUMENTS

| 5,655,004 A | 8/1997 | Holbrook |
| 7,578,438 B2 | 8/2009 | Hogg et al. |

(Continued)

OTHER PUBLICATIONS

Bank of America Corporation, European Patent Application No. 22159983.0, Extended European Search Report, dated Jul. 26, 2022.
(Continued)

*Primary Examiner* — Daniel B Potratz
*Assistant Examiner* — Syed M Ahsan
(74) *Attorney, Agent, or Firm* — Moore & Van Allen PLLC; Vaidehi Bachoti

(57) ABSTRACT

Embodiments of the invention are directed to a system, method, or computer program product for cross-channel network security with tiered adaptive mitigation operations. In this regard, the invention is structured for dynamic detection of security events associated with network devices and resources, and triggering real-time mitigation operations across a plurality of resource channels. The invention provides a novel method for employing activity data to construct and implement mitigation actions for de-escalating authorization tiers that are adapted to the specific attributes of the activity data, in order to prevent security exposure associated with the activity. Another aspect of the invention is directed to determining whether to continue the tiered adaptive mitigation actions and/or trigger a security proceed signal.

20 Claims, 5 Drawing Sheets

(56) References Cited

U.S. PATENT DOCUMENTS

| | | |
|---|---|---|
| 7,809,650 B2 | 10/2010 | Bruesewitz et al. |
| 7,860,783 B2 | 12/2010 | Yang et al. |
| 8,032,449 B2 | 10/2011 | Hu et al. |
| 8,065,233 B2 | 11/2011 | Lee et al. |
| 8,606,712 B2 | 12/2013 | Choudhuri et al. |
| 8,688,572 B2 | 4/2014 | Shao et al. |
| 9,749,308 B2 | 8/2017 | Jones-Mcfadden et al. |
| 10,290,053 B2 | 5/2019 | Priess et al. |
| 2004/0039686 A1 | 2/2004 | Klebanoff |
| 2004/0088243 A1 | 5/2004 | Mccoy et al. |
| 2005/0086166 A1 | 4/2005 | Monk et al. |
| 2006/0073811 A1 | 4/2006 | Ekberg |
| 2009/0254975 A1 | 10/2009 | Turnbull et al. |
| 2009/0265775 A1 | 10/2009 | Wisely et al. |
| 2009/0307028 A1 | 12/2009 | Eldon et al. |
| 2010/0145857 A1 | 6/2010 | Davila et al. |
| 2011/0131131 A1 | 6/2011 | Griffin et al. |
| 2011/0184778 A1 | 7/2011 | Graepel et al. |
| 2011/0231305 A1 | 9/2011 | Winters |
| 2011/0238550 A1 | 9/2011 | Reich et al. |
| 2011/0238564 A1 | 9/2011 | Lim et al. |
| 2011/0251951 A1 | 10/2011 | Kolkowitz et al. |
| 2012/0066773 A1* | 3/2012 | Weisberger ........... H04L 9/3234 726/29 |
| 2012/0109802 A1 | 5/2012 | Griffin et al. |
| 2013/0023240 A1 | 1/2013 | Weiner |
| 2013/0232542 A1 | 9/2013 | Cheng et al. |
| 2013/0347100 A1 | 12/2013 | Tsukamoto et al. |
| 2015/0220907 A1 | 8/2015 | Denton et al. |
| 2016/0180322 A1 | 6/2016 | Song et al. |
| 2017/0195307 A1* | 7/2017 | Jones-McFadden ........................ H04W 12/06 |
| 2017/0195366 A1* | 7/2017 | Jones-McFadden .... H04L 63/20 |
| 2018/0033009 A1 | 2/2018 | Goldman et al. |
| 2019/0132328 A1* | 5/2019 | Sims ..................... G06N 20/00 |
| 2019/0251565 A1 | 8/2019 | Mullaney et al. |

OTHER PUBLICATIONS

Bank of America Corporation, European Patent Application No. 22159983.0, Communication pursuant to Article 94(3) EPC, dated Aug. 11, 2023.

* cited by examiner

CROSS-CHANNEL NETWORK SECURITY SYSTEM WITH TIERED ADAPTIVE MITIGATION OPERATIONS

FIELD OF THE INVENTION

The present invention is directed to a cross-channel network security system with tiered adaptive mitigation operations, based on the type of the user activity, technological parameters of devices used to conduct the activity, and/or the like. Furthermore, the present invention embraces a novel, proactive approach to safeguarding user information.

BACKGROUND

Over the last few years, there has been a significant increase in the number of electronic activities, due to widespread use of smartphone, tablet computers, laptop computers, transaction terminals, and electronic computing devices in general which are configured for accepting authentication credentials in electronic form. Identifying and preventing unauthorized exposure of users' electronic information, and ensuring the security of electronic activities is crucial. Typically, in conventional systems, one or more activities may be initiated using a network device, with the activities seeking to access, modify, transfer, and/or otherwise operate upon secure data and resources associated with a user. However, conventional systems typically process these activities merely based on mere authentication credentials. Moreover, because only a set of one or more credentials, which typically do not change for one user activity to another, are required to be validated for performing the user activity at a point in time, the veracity of the source/provider of credentials cannot be ascertained in conventional systems. Conventional systems typically cannot detect whether the activities are being initiated by an unauthorized entity/individual in the first place in real-time, and hence undesirably may let the unauthorized activity proceed. Conventional systems typically may only be able to detect that the activity is unauthorized after the activity is processed, rendering them unable to prevent exposure of secure data in real time. Accordingly, there is a need for a network security system that solves the foregoing problems in conventional technology and provides real-time detection and real-time prevention of unauthorized activities, in an adaptive proactive manner. The previous discussion of the background to the invention is provided for illustrative purposes only and is not an acknowledgement or admission that any of the material referred to is or was part of the common general knowledge as at the priority date of the application.

SUMMARY

In one aspect, the present invention is directed to in general a cross-channel network security system with tiered adaptive mitigation operations, a corresponding method, and computer program product. The system is structured for dynamic detection of security events associated with network devices and resources, and triggering real-time mitigation operations across a plurality of resource channels. The system typically includes at least one processing device operatively coupled to at least one memory device and at least one communication device connected to a distributed network. The system also typically includes a module stored in the at least one memory device comprising executable instructions that when executed cause the processing device and hence the system to perform one or more functions described below. In one embodiment, the system is configured to: receive, from a first network device, a request to execute a first activity via a first activity channel, wherein the first activity is associated with a first resource; extract activity data regarding the first network device and the first resource; escalate, in real-time, a level of authentication required for executing the first activity via the first activity channel based on determining that (i) the first activity is associated with a security event, and/or (ii) the first network device is associated with a negative security device, such that processing of the first activity via the first activity channel is ceased for a first time interval at least until a security proceed signal is determined; construct one or more tiered adaptive mitigation actions based on at least the activity data, wherein the one or more tiered adaptive mitigation actions comprise de-escalating (i) an action tier, (ii) a resource tier, and/or (iii) a device tier associated with the first activity; trigger, in real-time, initiation of the one or more tiered adaptive mitigation actions, prior to the first activity via the first activity channel to prevent security exposure associated with the first activity; and in response to determining an authorization validation status of the activity data, continue the one or more tiered adaptive mitigation actions and/or trigger the security proceed signal.

In another embodiment, and in combination with the previous embodiment, determining that the first network device is associated with a negative security device comprises: analyzing the activity data comprising device information associated with the first network device; identifying at least one local network associated with the first network device based on the device information, wherein the first network device is in communication with the at least one local network during the first activity; and determining that (i) the at least one local network, (ii) one or more local devices in communication with the at least one local network, and/or (iii) one or more stored applications of the first network device, are associated with a predetermined security event.

In another embodiment, and in combination with any of the previous embodiments, determining that the first network device is associated with a negative security device comprises: scanning a predetermined memory location of the first network device; and determining that (i) the predetermined memory location of the first network device does not comprise a stored device authentication token, or that (ii) a stored device authentication token at the predetermined memory location is not active.

In another embodiment, and in combination with any of the previous embodiments, determining that the first network device is associated with a negative security device comprises determining that the first activity channel of the first activity is associated with a predetermined security event.

In another embodiment, and in combination with any of the previous embodiments, determining that the first activity is associated with a security event comprises: analyzing the activity data comprising resource information associated with the first resource and one or more related second resources; and determining that one or more prior predetermined security events associated with the first resource and/or the one or more related second resources exceed a predetermined threshold.

In another embodiment, and in combination with any of the previous embodiments, the one or more tiered adaptive mitigation actions comprise de-escalating the action tier, wherein initiating the one or more tiered adaptive mitigation actions further comprises: implementing a partial block of the first resource such that the first activity associated with the first resource is blocked; receiving a request to execute a second activity associated with the first resource; and processing the second activity in response to determining that the second activity has a level of authentication below a predetermined threshold.

In another embodiment, and in combination with any of the previous embodiments, the one or more tiered adaptive mitigation actions comprise de-escalating the resource tier, wherein initiating the one or more tiered adaptive mitigation actions further comprises: determining one or more second resources associated with the first resource; and implementing a block on the one or more second resources such that execution of one or more second activities associated with the one or more second resources is prevented.

In another embodiment, and in combination with any of the previous embodiments, the one or more tiered adaptive mitigation actions comprise de-escalating the device tier, wherein initiating the one or more tiered adaptive mitigation actions further comprises: implementing a block of the first activity channel such that the first activity associated with the first resource is blocked; receiving a request to execute a second activity via the first activity channel; and preventing processing of the second activity via the first activity channel.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
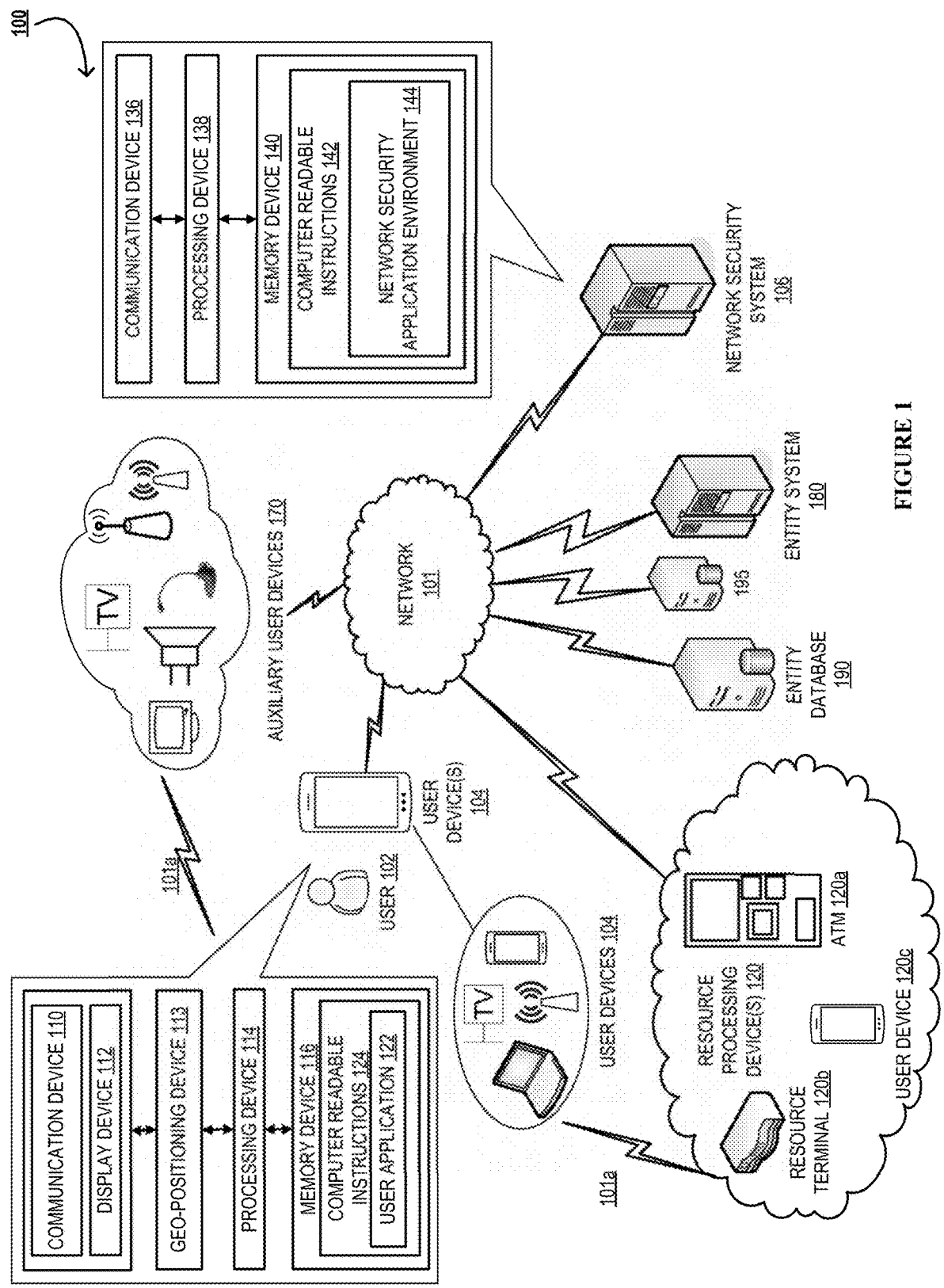
Figure 2:
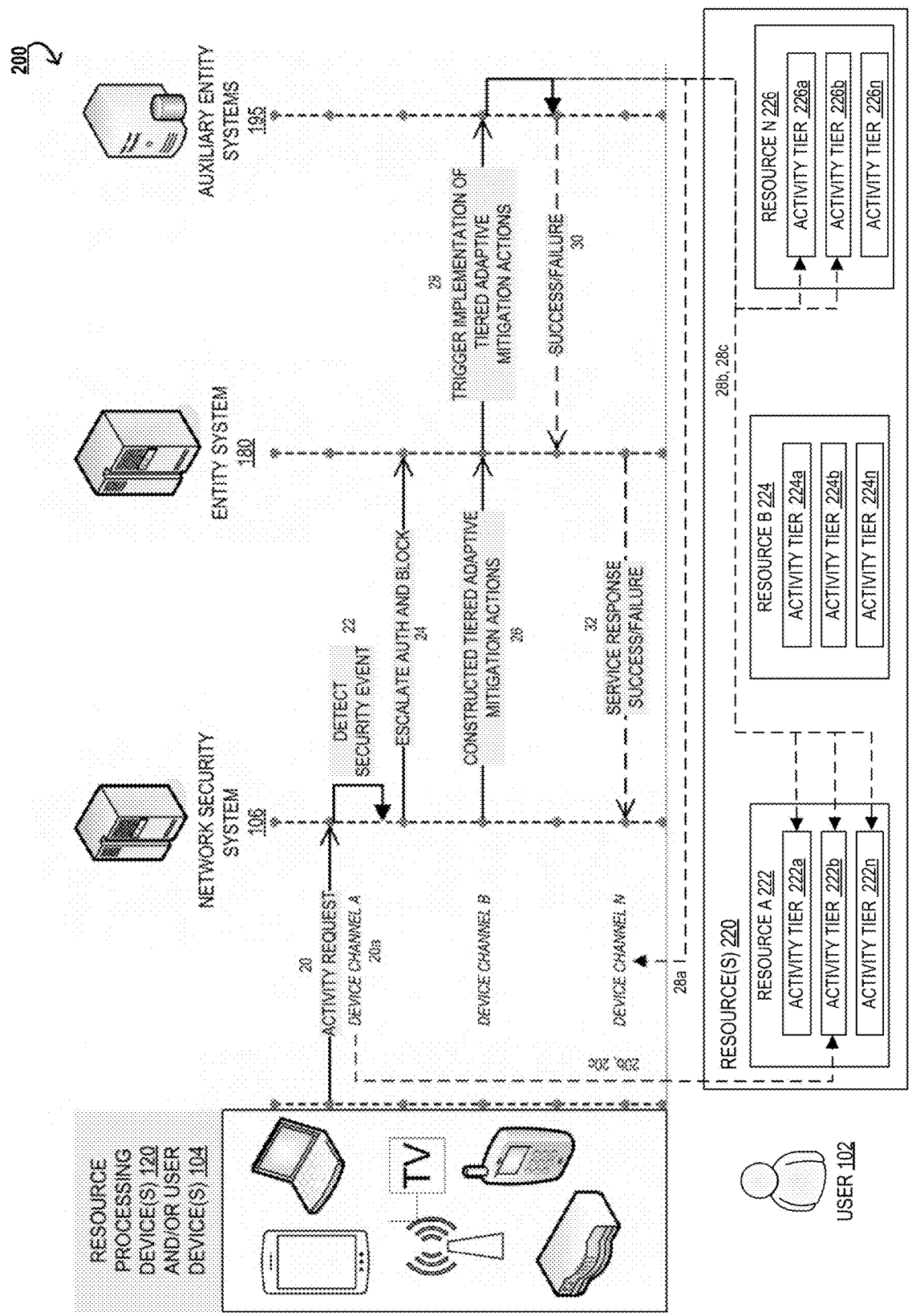
Figure 3:
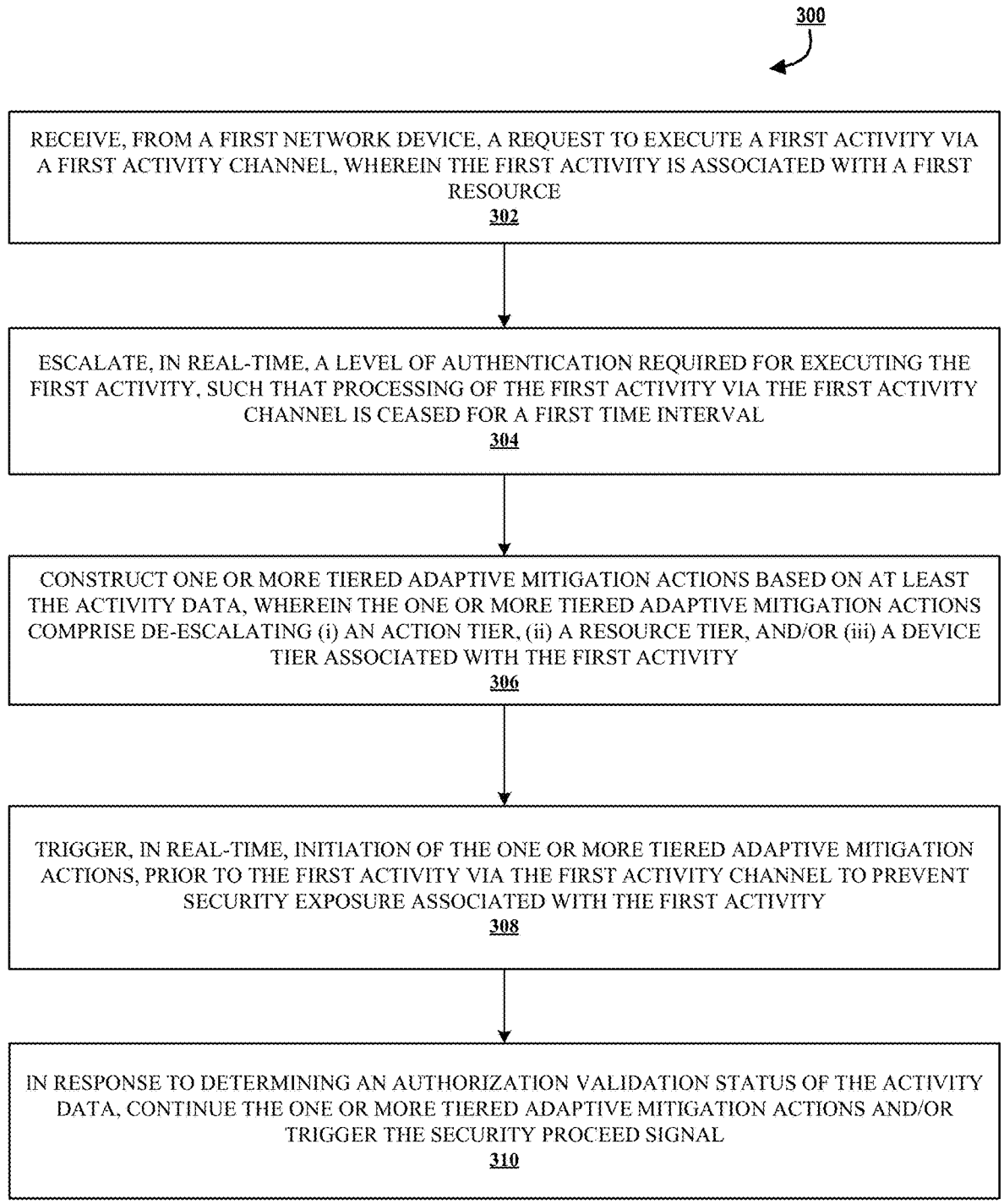
Figure 4A:
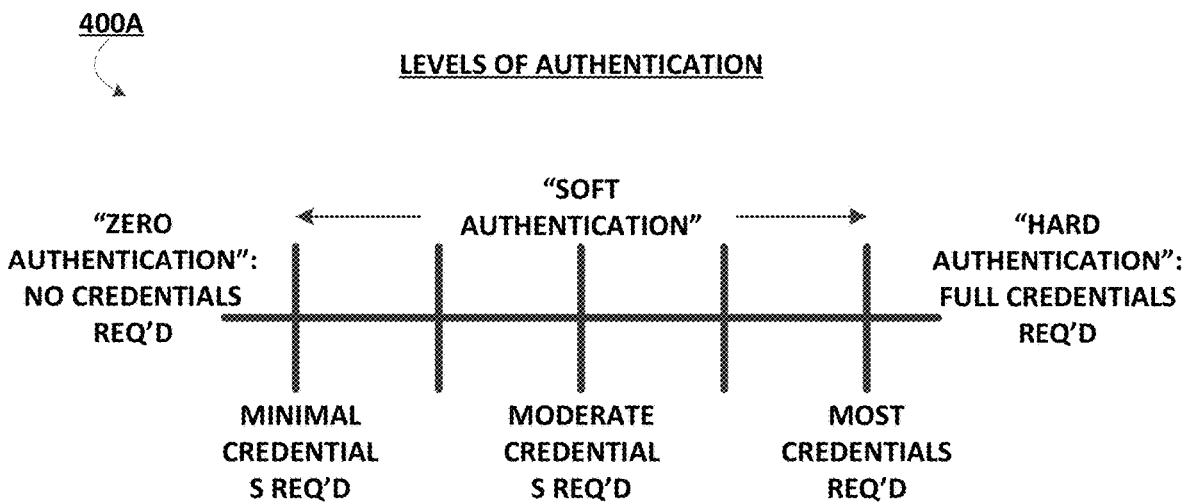
Figure 4B:
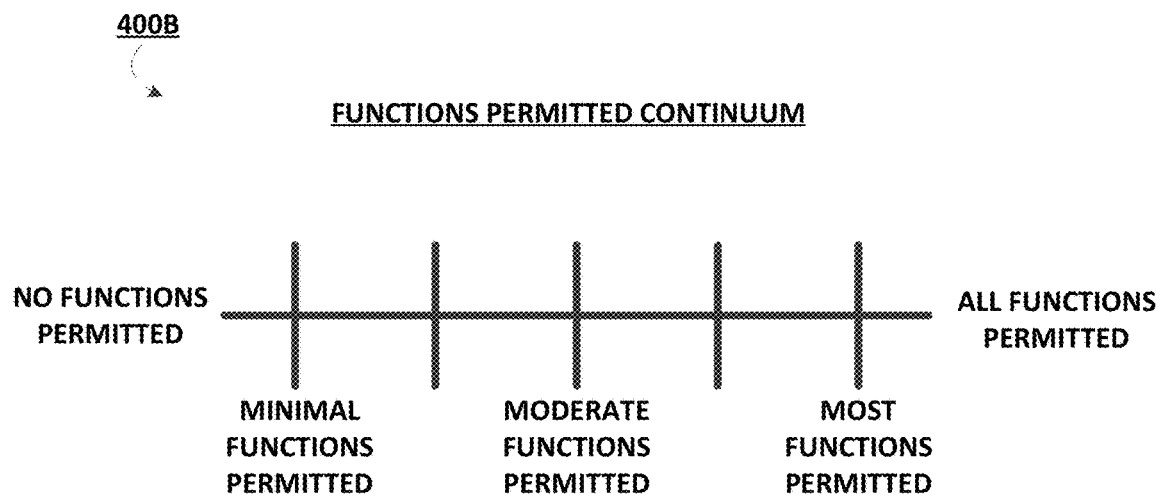
Figure 4C:
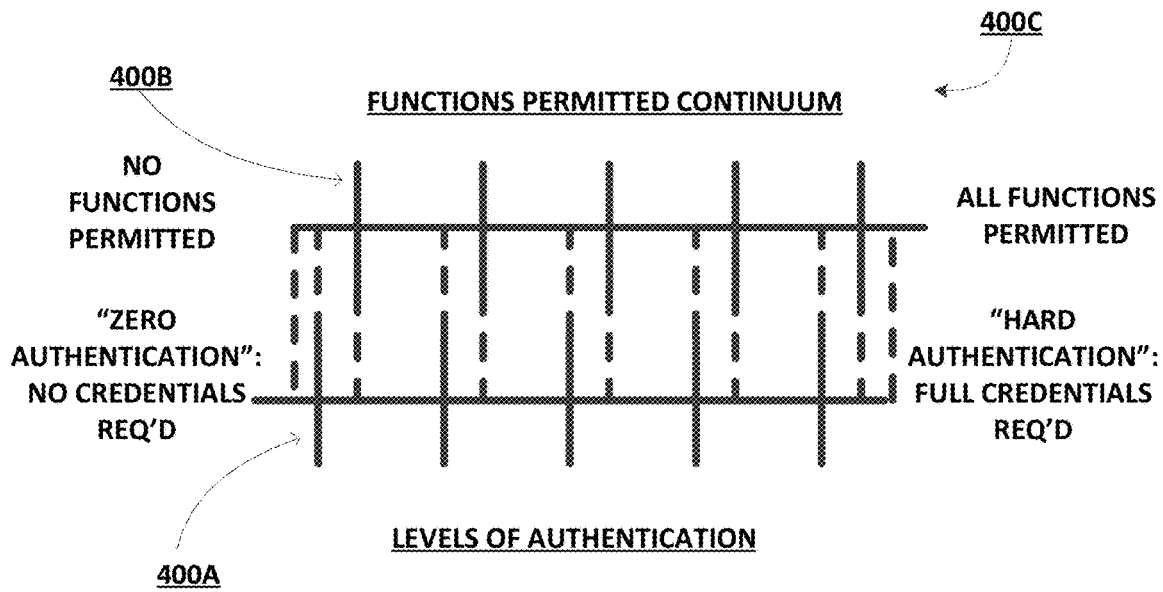
Figure 4D:
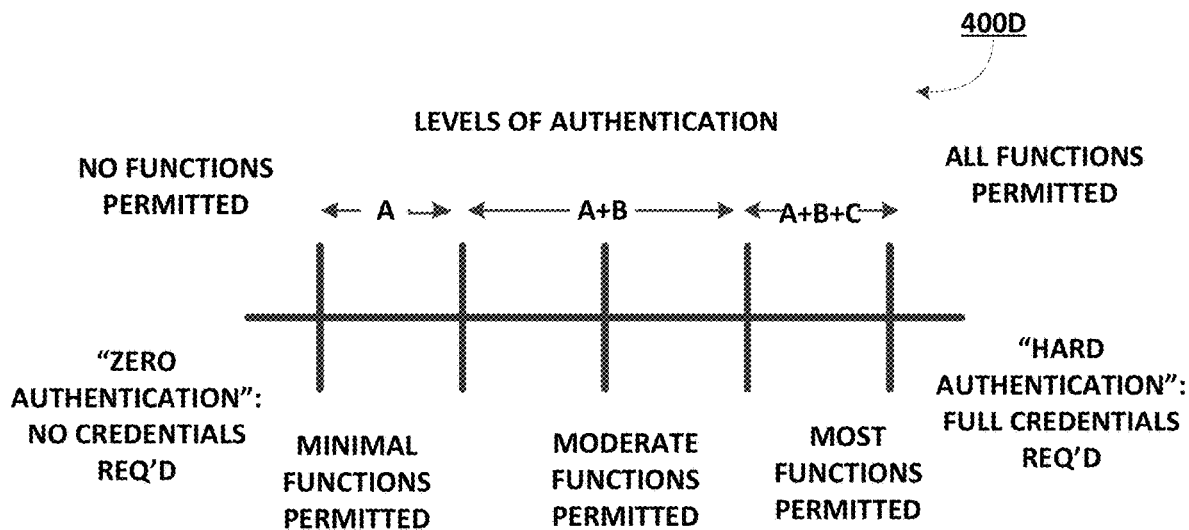

Having thus described embodiments of the invention in general terms, reference will now be made the accompanying drawings, wherein:

FIG. 1 depicts a network environment 100 for a cross-channel network security system with tiered adaptive mitigation operations, in accordance with one embodiment of the present invention;

FIG. 2 depicts a schematic diagram 200 illustrating dynamic detection of security events associated with network devices and resources, and triggering real-time mitigation operations across a plurality of resource channels via the network environment of FIG. 1, in accordance with one embodiment of the present invention;

FIG. 3 schematically depicts a high-level process flow for cross-channel network security with tiered adaptive mitigation operations, in accordance with one embodiment of the present invention;

FIG. 4A presents an illustration of the authentication continuum in accordance with one embodiment of the invention;

FIG. 4B presents an illustration of the functions permitted continuum in accordance with one embodiment of the invention;

FIG. 4C presents an illustration of the coupling of the functions permitted continuum and the levels of authentication continuum in accordance with one embodiment of the invention; and FIG. 4D presents an illustration of the relationship between the functions permitted and the authentication types in accordance with one embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In some embodiments, an "entity" as used herein may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, information provided by the user, or the like. The account is associated with and/or maintained by an entity. In other embodiments, an "entity" may not be a financial institution.

Unless specifically limited by the context, a "user activity", "transaction" or "activity" refers to any communication between the user and a financial institution or another entity. In some embodiments, for example, a user activity may refer to a purchase of goods or services, a return of goods or services, a payment transaction, a credit transaction, or other interaction involving a user's bank account. As another example, in some embodiments, a user activity may refer to viewing account balances, modifying user information and contact information associated with an account, modifying alert/notification preferences, viewing transaction/activity history, transferring/redeeming loyalty points and the like. In some embodiments, the user activity is associated with an entity application stored on a user device, for example, a digital wallet application, a mobile/online banking application, a merchant application, a browser application, a social media application and the like. Typically, a user activity is an electronic transaction or electronic activity in which the user is employing a mobile device, computing device, or other electronic device to initiate, execute and/or complete the activity.

As used herein, a "bank account" refers to a credit account, a debit/deposit account, or the like. Although the phrase "bank account" includes the term "bank," the account need not be maintained by a bank and may, instead, be maintained by other financial institutions. For example, in the context of a financial institution, a user activity or transaction may refer to one or more of a sale of goods and/or services, an account balance inquiry, a rewards transfer, an account money transfer, opening a bank application on a user's computer or mobile device, a user accessing their e-wallet (e.g., mobile wallet) or online banking account or any other interaction involving the user and/or the user's device that is detectable by the financial institution. As further examples, a user activity may occur when an entity associated with the user is alerted via the transaction of the user's location. A user activity may occur when a user accesses a building, uses a rewards card, and/or performs an account balance query. A user activity may occur as a user's device establishes a wireless connection, such as a Wi-Fi connection, with a point-of-sale terminal. In some embodiments, a user activity may include one or more of the following: purchasing, renting, selling, and/or leasing goods and/or services (e.g., groceries, stamps, tickets, DVDs, vending machine items, and the like); withdrawing cash; making payments (e.g., paying monthly bills; paying federal, state, and/or local taxes; and the like); sending remittances; transferring balances from one account to another account; loading money onto stored value cards (SVCs) and/or prepaid cards; donating to charities; and/or the like.

As used herein, an "online banking account" is an account that is associated with one or more user accounts at a financial institution. For example, the user may have an online banking account that is associated with the user's checking account, savings account, investment account, and/or credit account at a particular financial institution. Authentication credentials comprising a username and password are typically associated with the online banking account and can be used by the user to gain access to the online banking account. The online banking account may be accessed by the user over a network (e.g., the Internet) via a computer device, such as a personal computer, laptop, or mobile device (e.g., a smartphone or tablet). The online banking account may be accessed by the user via a mobile or online banking website or via a mobile or online banking application. A customer may access an online banking account to view account balances, view transaction history, view statements, transfer funds, and pay bills. More than one user may have access to the same online banking account. In this regard, each user may have a different username and password. Accordingly, one or more users may have a sub-account associated with the online banking account.

A "user" may be an individual or group of individuals associated with an entity that provides the system for assessing network authentication requirements based on situational instance. In some embodiments, the "user" may be a financial institution user (e.g., an account holder or a person who has an account (e.g., banking account, credit account, or the like)). In one aspect, a user may be any financial institution user seeking to perform user activities associated with the financial institution or any other affiliate entities associated with the financial institution. In some embodiments, the user may be an individual who may be interested in opening an account with the financial institution. In some other embodiments, a user may be any individual who may be interested in the authentication features offered by the financial institution/entity. In some embodiments, a "user" may be a financial institution employee (e.g., an underwriter, a project manager, an IT specialist, a manager, an administrator, an internal operations analyst, bank teller or the like) capable of operating the system described herein. For purposes of this invention, the term "user" and "customer" may be used interchangeably.

An electronic activity, also referred to as a "technology activity", "technology activity event", or a "user activity", such as a "resource transfer" or "transaction", may refer to any activities or communication between a user or entity and the financial institution, between the user and the entity, activities or communication between multiple entities, communication between technology applications and the like. A resource transfer may refer to a payment, processing of funds, purchase of goods or services, a return of goods or services, a payment transaction, a credit transaction, or other interactions involving a user's resource or account. In the context of a financial institution or a resource entity such as a merchant, a resource transfer may refer to one or more of: transfer of resources/funds between financial accounts (also referred to as "resources"), deposit of resources/funds into a financial account or resource (for example, depositing a check), withdrawal of resources or finds from a financial account, a sale of goods and/or services, initiating an automated teller machine (ATM) or online banking session, an account balance inquiry, a rewards transfer, opening a bank application on a user's computer or mobile device, a user accessing their e-wallet, applying one or more coupons to purchases, or any other interaction involving the user and/or the user's device that invokes or that is detectable by or associated with the financial institution. A resource transfer may also include one or more of the following: renting, selling, and/or leasing goods and/or services (e.g., groceries, stamps, tickets, DVDs, vending machine items, and the like); making payments (e.g., paying monthly bills; and the like); loading money onto stored value cards (SVCs) and/or prepaid cards; donating to charities; and/or the like. Unless specifically limited by the context, a "resource transfer," a "transaction," a "transaction event," or a "point of transaction event," refers to any user activity (financial or non-financial activity) initiated between a user and a resource entity (such as a merchant), between the user and the financial instruction, or any combination thereof. In some embodiments, a resource transfer or transaction may refer to financial transactions involving direct or indirect movement of funds through traditional paper transaction processing systems (i.e. paper check processing) or through electronic transaction processing systems. In this regard, resource transfers or transactions may refer to the user initiating a funds/resource transfer between account, funds/resource transfer as a payment for the purchase for a product, service, or the like from a merchant, and the like. Typical financial transactions or resource transfers include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures, and the like.

In accordance with embodiments of the invention, the term "user" may refer to a customer or the like, who utilizes an external apparatus such as a user device, for executing resource transfers or transactions. The external apparatus may be a user device (computing devices, mobile devices, smartphones, wearable devices, auxiliary devices, and the like), a payment instrument (credit cards, debit cards, checks, digital wallets, currency, loyalty points), and/or payment credentials (account numbers, payment instrument identifiers). In some embodiments, the user may seek to perform one or more user activities using a multi-channel cognitive resource application of the invention, which is stored on a user device (e.g., as a multi-channel cognitive resource user application mobile application of the user's smart phone). In some embodiments, the user may perform transactions by swiping payment instruments at a transaction terminal, for example, by swiping a magnetic strip of a credit card along a magnetic reader of a transaction terminal. In some embodiments, the transactions may be performed by wireless communication or "tapping" between the customer device and a transaction terminal. In accordance with some embodiments of the invention, the term "tap" or "tapping" may refer to bringing an external apparatus close to or within a predetermined proximity of the activity interface device or transaction terminal interface, or auxiliary user devices, so that information (such as encrypted tokens, financial resource/account identifiers, and the like) can be communicated wirelessly between the external apparatus and the devices using short range wireless transmission technology, such near-field communication (NFC) technology, radio-frequency (RF) technology, audio-frequency communication, or the like. Tapping may include physically tapping the user device against an appropriate portion of the auxiliary user device or the transaction terminal or it may include only waving or holding the user device near an appropriate portion of the auxiliary user device or the transaction terminal without making physical contact with the transaction terminal.

Over the last few years, there has been a significant increase in the number of electronic activities, due to widespread use of smartphone, tablet computers, laptop computers, transaction terminals, and electronic computing devices in general which are configured for accepting authentication credentials in electronic form. Identifying and preventing unauthorized exposure of users' electronic information, and ensuring the security of electronic activities is crucial. Specifically, maintaining security of activity data from networked devices and determining authorization of the users and/or the entities involved in the activities is an important concern. Typically, in conventional systems, one or more activities may be initiated using a network device, with the activities seeking to access, modify, transfer, and/or otherwise operate upon secure data and resources associated with a user. However, conventional systems typically process these activities merely based on mere authentication credentials. The credentials may be intercepted or accessed by unauthorized entities during transmission via a single communication channel which may then be utilized for future unauthorized user activities without the permission of the user. Moreover, because only a set of one or more credentials, which typically do not change for one user activity to another, are required to be validated for performing the user activity at a point in time, the veracity of the source/provider of credentials cannot be ascertained in conventional systems.

Conventional systems typically cannot detect whether the activities are being initiated by an unauthorized entity/individual in the first place in real-time, and hence undesirably may let the unauthorized activity proceed. Conventional systems typically may only be able to detect that the activity is unauthorized after the activity is processed, rendering them unable to prevent exposure of secure data in real time. Moreover, even if conventional systems belatedly detect the unauthorized activity, they are not configured for tailoring actions to prevent exposure of secure data, if at all, in a manner specific to target the attributes of the unauthorized activity. Conventional systems may only be configured, if at all, for implementation of actions, typically undesirably delayed, only in channels that have been adversely affected in the first place. Accordingly, there is a need for a network security system that solves the foregoing problems in conventional technology and provides real-time detection and real-time prevention of unauthorized activities, in an adaptive proactive manner.

Typically, security/exposure events comprise unauthorized interception, utilization or modification of data at a first instance of time, particularly data that is routinely and necessarily available to an entity during a user activity (for example, a merchant requires payment credential information to process a purchase transaction). However, the associated user or entity may not be able to identify/discover the exposure until the intercepted data is used to perform at least one unauthorized activity/transaction at a later time, while the user's information continues to be unsecured. In such instances, identifying the mode of the exposure and the specific technological parameter that needs to be addressed may be possible, if at all, after a significant time lapse succeeding the unauthorized activity. The advantages provided by the present invention in this regard are threefold. Firstly, the present invention provides proactive and preventative security measures that assess and augment the security of technological parameters for an activity in real-time, before the occurrence of an unauthorized transaction. Secondly, the present invention is configured for tiered adaptive mitigation operations, i.e., tailoring actions to prevent exposure of secure data, in a manner specific to target the attributes of the unauthorized activity. Thirdly, the present invention is structured for cross-channel mitigation operations, which may be implemented across a variety of channels, e.g., other channels not affected by the unauthorized activity, thereby proactively safeguarding a variety of the user's data/resources from current and future unauthorized activities.

Embodiments of the present invention address the above needs and/or achieve other advantages by providing apparatuses (e.g., a system, computer program product and/or other devices) and methods for providing a cross-channel network security system with tiered adaptive mitigation operations, as will be described in detail elsewhere in the specification. FIG. 1 illustrates a system environment 100 for a cross-channel network security with tiered adaptive mitigation operations, in accordance with one embodiment of the present invention. FIG. 1 provides a unique system that includes specialized servers and systems, communicably linked across a distributive network of nodes required to perform the functions of providing dynamic security paradigms. The authentication system provides a dynamic platform for real-time detection of security events associated with network devices and resources, and triggering real-time mitigation operations across a plurality of resource channels.

FIG. 1 illustrates a network environment 100 for cross-channel network security with tiered adaptive mitigation operations, in accordance with one embodiment of the present invention. As illustrated in FIG. 1, a network security system 106, is provided configured for cross-channel network security with tiered adaptive mitigation operations. Specifically, the network security application environment 144 of the network security system 106 is structured for dynamic detection of security events associated with network devices and resources, and triggering real-time mitigation operations across a plurality of resource channels. The network security system 106 is operatively coupled, via a network 101 to one or more user devices 104, auxiliary user devices 170, resource processing devices 120, entity system(s) 180 (e.g., financial institution systems 180), entity databases 190, auxiliary entity system(s) 195 (e.g., authentication system 195), and other external systems/third-party servers not illustrated herein. In this way, the network security system 106 can send information to and receive information from multiple user devices 104, auxiliary user devices 170, resource processing devices 120, entity systems 180, and/or auxiliary entity system(s) 195, via network 101.

The network 101 may be a global area network (GAN), such as the Internet, a wide area network (WAN), a local area network (LAN), or any other type of network or combination of networks. The network 101 may provide for wireline, wireless, or a combination wireline and wireless communication between devices on the network 101. The network 101 is configured to establish an operative connection between otherwise incompatible devices, for example establishing a communication channel, automatically and in real time, between the one or more user devices 104 and one or more of the auxiliary user devices 170 and/or resource processing devices 120, (for example, based on receiving a user input, or when the user device 104 is within a predetermined proximity or broadcast range of the auxiliary devices 170 and/or resource processing devices 120), as illustrated by communication channel 101a. Therefore, the system, via the network 101 may establish, operative connections between otherwise incompatible devices, for example by establishing a communication channel 101a between the one or more user devices 104 and the auxiliary user devices 170 and/or resource processing devices 120. In this regard, the network 101 (and particularly the communication channels 101a) may take the form of contactless interfaces, short range wireless transmission technology, such near-field communication (NFC) technology, near-field low energy communication, audio frequency (AF) waves, wireless personal area network, radio-frequency (RF) technology, and/or other suitable communication channels. Tapping may include physically tapping the external apparatus, such as the user device 104, against an appropriate portion of the auxiliary user device 170 and/or resource processing devices 120, or it may include only waving or holding the external apparatus near an appropriate portion of the auxiliary user device without making physical contact with the auxiliary user device and/or resource processing devices 120.

In some embodiments, the user 102 is an individual that wishes to conduct one or more electronic activities or technology activity events with resource entities, for example using the user device 104. As such, in some instances, the user device may have multiple user applications 122 stored/installed on the user device 104 and the memory device 116 in particular. In some embodiments, the user application 122 is used to conduct one or more electronic activities or technology activity events with resource entities. In some embodiments the user application 122 may refer to a third party application or a user application stored on a cloud used to access the network security system 106 and/or the auxiliary user device 170 through the network 101, communicate with or receive and interpret signals from auxiliary user devices 170, and the like. The user 102 may subsequently navigate through the interface, perform one or more searches or initiate one or more activities or resource transfers using a user interface provided by the user application 122 of the user device 104. In some embodiments, the user 102 may be routed to a particular destination using the user device 104. In some embodiments, a purchase or a transaction may be made by the user 102 using the user device 104. In some embodiments the auxiliary user device 170 requests and/or receives additional information from the network security system 106, entity system 180 and/or the user device 104 for authenticating the user and/or the user device, determining appropriate transaction queues, performing the transactions and other functions.

FIG. 1 also illustrates the user device 104. The user device 104, herein referring to one or more user devices, wherein each device may generally comprise a communication device 110, a display device 112, a geo-positioning device 113, a processing device 114, and a memory device 116. Typically, the user device 104 is a computing system that allows a user 102 to interact with other systems to initiate or to complete activities, resource transfers, and transactions for products, and the like. The processing device 114 is operatively coupled to the communication device 110 and the memory device 116. The processing device 114 uses the communication device 110 to communicate with the network 101 and other devices on the network 101, such as, but not limited to the entity system 180, the auxiliary user device 170, resource processing devices 120, and the network security system 106. As such, the communication device 110 generally comprises a modem, server, or other device for communicating with other devices on the network 101. In some embodiments the network 101 comprises a network of distributed servers. In some embodiments, the processing device 114 may be further coupled to a display device 112, a geo-positioning device 113, and/or a transmitter/receiver device, not indicated in FIG. 1. The display device 112 may comprise a screen, a speaker, a vibrating device or other devices configured to provide information to the user. In some embodiments, the display device 112 provides a presentation of the user interface of the user application 122. The geo-positioning device 113 may comprise global positioning system (GPS) devices, triangulation devices, accelerometers, and other devices configured to determine the current geographic location of the user device 104 with respect to satellites, transmitter/beacon devices, telecommunication towers and the like. In some embodiments the user device 104 may include authentication devices like fingerprint scanners, microphones and the like that are configured to receive bio-metric authentication credentials from the user.

The user device 104 comprises computer-readable instructions 124 stored in the memory device 116, which in one embodiment includes the computer-readable instructions 124 of the user application 122. In this way, users 102 may authenticate themselves, initiate activities, and interact with or receive and decode signals from the auxiliary user devices 170 and/or resource processing devices 120, communicate with the network security system 106, authorize a transaction, and/or complete a transaction using the central user interface of the user device 104. As discussed previously, the user device 104 may be, for example, a desktop personal computer, a mobile system, such as a cellular phone, smart phone, personal data assistant (PDA), laptop, wearable device, a smart TV, a smart speaker, a home automation hub, augmented/virtual reality devices, or the like. The computer readable instructions 124 such as computer readable/executable code of the multi-channel cognitive resource user application 122, when executed by the processing device 114 are configured to cause the user device 104 and/or processing device 114 to perform one or more steps described in this disclosure, or to cause other systems/devices to perform one or more steps described herein.

The resource processing devices 120 or transaction terminals as used herein may refer to one or more electronic devices that facilitate user transactions or activities. In this regard the resource processing devices 120 can comprise Automated Teller Machines (ATMs), resource terminals or Point of sale devices (POS), vending machines, checkout registers, ticket vending machines, automated retail transaction devices, banking terminals in a financial institution and other transaction terminals that involve financial transactions in one form or another. In some embodiments the resource processing device 120 refers to devices that facilitate execution of non-financial transactions or activities, for example, check-in terminals for various industries, for example: hospitality, travel, and the like, information kiosks and other transaction terminals that do not involve a user performing a financial transaction via the transaction terminal. In some embodiments the resource processing devices 120 facilitate execution of both financial and non-financial transactions/activities. In some embodiments, resource processing devices 120 may refer to user devices that facilitate financial and/or non-financial transactions, such as laptop computers, tablet computers, smartphones, wearable devices, personal digital assistants (PDAs), and other portable or stationary computing devices. In some embodiments, the resource processing devices 120 may be owned, operated and/or otherwise associated entities and are installed at suitable locations, such that the user can travel to the location of the resource processing device to execute transactions. In some embodiments, the resource processing device 120 may be owned, operated and/or otherwise associated with an entity, such as a financial institution. In some embodiments, the resource processing devices 120 may be owned, operated and/or otherwise associated with the user. The embodiments described herein may refer to the initiation and completion of an electronic activity, a user activity or a transaction.

As illustrated by FIG. 1, the resource processing device 120 may comprise an ATM 120a, a resource terminal 120b (e.g., a point of sale terminal 120b), a user device 120c (such as one or more user device 104 and/or one or more auxiliary user devices 170), vending machines and/or other devices that are configured to facilitate the user activity. The user device 120c may be one of the user devices 104 and may comprise a mobile communication device, such as a cellular telecommunications device (i.e., a smart phone or mobile phone), a computing device such as a laptop computer, a personal digital assistant (PDA), a mobile Internet accessing device, or other mobile device including, but not limited to portable digital assistants (PDAs), pagers, mobile televisions, laptop computers, cameras, video recorders, audio/video player, radio, GPS devices, any combination of the aforementioned, or the like. The resource processing device 120 may include a communication device, a processing device, a user interface, an authentication device and a memory device having an authentication application/module, a resource datastore and one or more processing applications stored therein.

In some embodiments, the network security system 106 (also referred to as the cross-channel network security system environment 106) comprises a plurality of networked devices, systems, applications, an electronic communication generating and network security application environment 144 (detailed in FIG. 2) and/or servers associated with technology infrastructure of an entity, in operative communication, as illustrated in FIG. 2 described later on. As further illustrated in FIG. 1, the network security system 106 generally comprises a communication device 136, at least one processing device 138, and a memory device 140. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 138 is operatively coupled to the communication device 136 and the memory device 140. The processing device 138 uses the communication device 136 to communicate with the network 101 and other devices on the network 101, such as, but not limited to the entity systems 180, auxiliary user devices 170, resource processing devices 120, and/or the user device 104. The processing device 138 uses the communication device 136 to communicate with the network 101 and other devices of the entity's technology infrastructure, such as, but not limited to plurality of networked devices, systems, technology applications, an electronic communication generating and network security application environment 144 (whose operations/features are schematically illustrated in FIG. 2) and/or servers that may be located across various geographical locations, e.g., via an entity network (not illustrated). As such, the communication device 136 generally comprises a modem, server, wireless transmitters, or other devices for communicating with devices on the network 101. The memory device 140 typically comprises a non-transitory computer readable storage medium, comprising computer readable/executable instructions/code, such as the computer-readable instructions 142, as described below.

As further illustrated in FIG. 1, the network security system 106 comprises computer-readable instructions 142 or computer readable program code 142 stored in the memory device 140, which in one embodiment includes the computer-readable instructions 142 of a network security application 144 or a network security application environment 144. The computer readable instructions 142, when executed by the processing device 138 are configured to cause the system 106/processing device 138 to perform one or more steps described in this disclosure to cause out systems/devices (such as the user device 104, the user application 122, resource processing devices 120, entity system 180, entity database 190, and the like) to perform one or more steps described herein. In some embodiments, the memory device 140 includes a data storage for storing data related to user transactions and resource entity information, but not limited to data created and/or used by the network security application 144. The network security application 144, when operated by the processing device 138 is structured for cross-channel network security with tiered adaptive mitigation operations.

FIG. 1 further illustrates one or more auxiliary user devices 170, in communication with the network 101. The auxiliary user devices may comprise peripheral devices such as speakers, microphones, smart speakers, and the like, display devices, a desktop personal computer, a mobile system, such as a cellular phone, smart phone, personal data assistant (PDA), laptop, wearable device, a smart TV, a smart speaker, a home automation hub, augmented/virtual reality devices, or the like. In some embodiments, the structure and/or functioning of the auxiliary user devices 170 is substantially similar to that of the user device(s) 104, while in other embodiments, the auxiliary user devices 170 supplement/enhance the structure and/or functioning of the user device(s) 104.

FIG. 2 depicts a schematic diagram 200 illustrating dynamic detection of security events associated with network devices and resources, and triggering real-time mitigation operations across a plurality of resource channels via the network environment of FIG. 1, in accordance with one embodiment of the present invention. The functions and features described herein may be performed, at least in part, by the network security system 106 via the network security application 144, in some embodiments. The network security system 106 and the network security application 144 in particular is structured for cross-channel network security with tiered adaptive mitigation operations. The network security system 106 and the network security application 144 in particular is also structured for dynamic detection of security events associated with network devices and resources, and triggering real-time mitigation operations across a plurality of resource channels.

As discussed, the user may seek to perform one or more activities. Each of these activities are typically associated with one or more "technology attributes", also referred to as "tiers", which delineate the characteristics, compatible functions, network devices, resources, actions and/or the like for the activity. Typically, in some embodiments, each activity is initiated by the user via a network device, to perform a particular action on/using a particular resource. In this regard, the one or more technology attributes/tiers associated with the activity may comprise (i) a device tier technology attribute reflecting the network device utilized and associated communication/device channels, (ii) an action tier technology attribute reflecting the action/task to be performed, and/or (iii) a resource tier technology attribute reflecting the resource on or using which the action/task is to be performed, as will be described in detail below.

Typically, as discussed previously, the user 102 may be associated with/operate upon, one or more devices (one or more of the user device(s) 104 and/or resource processing device(s) 120) with each device being associated with device tier attributes such as device data (e.g., device identifier data, geo-location data, etc.), application data (e.g., stored applications, etc.), device communication channel (e.g., associated communication network type such as wireless/Wi-Fi communication network, near-field communication, wired/contact based communication, network characteristics such as network security, etc.), and/or the like.

As discussed previously, a user 102 may be associated with one or more resources 220 (also referred to as one or more resource tiers 220). As illustrated in FIG. 2, the one or more resources 220 may comprise a first resource A 222 (e.g., a digital wallet associated with a first resource/payment token/credential), a second resource B 224 (e.g., a checking account, a resource instrument such as a credit card), . . . , and/or a $n^{th}$ resource N 226 (e.g., a deposit/savings account). Each of the resources comprises one or more technology attributes, also referred to as "tiers", which delineate the characteristics, compatible actions/functions, and/or the like for the resource. Typically, each resource is associated with one or more activity tiers associated with compatible activities that can be performed on/with the respective resource and the associated authentication/authorization level required. In other words, Typically, an activity tier of a resource may reflect a compatible activity that can be performed on/with the respective resource and the associated authentication/authorization level required for its completion. For instance, as illustrated, the first resource A 222 may comprise a first activity tier 222a (e.g., associated with a low authentication level below a first threshold, such as viewing/accessing activity data associated with resource A, in-person activities at an authorized entity location, activities with determined secure devices of the authorized user, and/or the like), a second activity tier 222b (e.g., associated with a medium authentication level above the first threshold and below a second threshold, such as existing outgoing resource transfers such as automatic bill payments associated with previously authenticated/authorized recipients, activities within predetermined secure authorized user location parameters (e.g., user city/state geographic parameters provided by the user), and/or the like), . . . , and/or a $n^{th}$ activity tier 222n (e.g., associated with a high authentication level above the second threshold, such as new outgoing resource transfers to new recipients and/or with resource amounts/values greater than a predetermined limit, activities conducted from new locations not associated with the authorized user, activities conducted from negative devices, and/or the like). Similarly, the second resource B 224 may comprise a first activity tier 224a, a second activity tier 224b, . . . , and/or a $n^{th}$ activity tier 224n, and the $n^{th}$ resource N 226 may comprise a first activity tier 226a, a second activity tier 226b, . . . , and/or a $n^{th}$ activity tier 226n as well.

As illustrated by FIG. 2, the network security system 106 may receive an activity request 20 to execute a first activity from a first network device (e.g., one or more of the user device(s) 104 and/or resource processing device(s) 120). The system 106 may then extract activity data regarding the first network device and the first resource. The activity data may comprise technology attribute/tier data associated with the activity request, user information provided by the user, historical user activity logs, and/or the like. In some embodiments, extracting activity data regarding the first network device and the first resource comprises at least constructing the relevant technology attribute/tier data associated with the activity request. As discussed above, the activity request 20 is typically associated with a plurality of technology attributes, e.g., one or more of (i) an action tier technology attribute, (ii) a resource tier attribute technology attribute, and/or (iii) a device tier attribute technology attribute. In other words, the activity request 20 is transmitted from a particular device associated with a particular device/communication channel (e.g., device tier) associated with performing a particular action (e.g., an action tier) on one or more resources 220 (e.g., a resource tier). As a non-limiting example, FIG. 2 illustrates that the activity request 20 is transmitted from a particular device associated with a device/communication channel A (e.g., device tier 20a)

associated with performing a particular action 222b (e.g., an action tier 20b) on resource A 222 (e.g., a resource tier 20c).

The network security system 106 may then analyze, dynamically and in real-time, activity data regarding the activity request 20, e.g., the associated originating device channel A, resource A 222, activity 222b, etc. Here, the network security system 106 may analyze the activity data, dynamically and in real-time, to determine whether the activity request 20 is associated with an exposure event or security event (e.g., associated with an existing exposure event, a potential future exposure event, etc.) and to determine how to prevent the exposure event from occurrence or completion so that the user's data and resources are not adversely affected therefrom. As illustrated by FIG. 2, the system may detect a security event 22 (also referred to as an exposure event), in response to determining that at least a portion of the activity data is associated with an unauthorized exposure event. Here, the network security system 106 may determine that (i) the activity request 20 is associated with a security event, and/or (ii) the network device channel A is associated with a negative security device.

As a non-limiting example, the system may determine that the network device channel A is associated with a negative security device based on determining that the device associated with the network device channel A is located outside a predetermined geographic region associated with the user. For instance, here, the system may determine that the user is not located at the location of the device associated with the network device channel A, e.g., based on determining that the user provided biometric authentication credentials (that were successfully authenticated) within a predetermined time preceding the activity request 20, and/or at a location that is outside a predetermined distance range from the location of the device associated with the network device channel A (e.g., determined based on the time it would likely take for travel between the locations), based on determining that the location of the device associated with the network device channel A is subject to local travel restrictions preventing the user from arriving there, and/or the like. As another non-limiting example, the system may determine that the network device channel A is associated with a negative security device based on determining that the device associated with the network device channel A and/or the network device channel A itself is associated with networks, devices, application, etc., which are identified to be associated with prior security events or be similar to those associated with prior security events, or whose security level is below a required security level.

As another non-limiting example, the system may determine that the activity request 20 is associated with a security event based on determining that the parameters of the activity request 20 overlap with a that of a historical security event pattern. As another non-limiting example, the system may determine that the activity request 20 is associated with a security event based on determining that the parameters of the activity request 20 do not match prior activities of the user that have been successfully authenticated/authorized. As yet another non-limiting example, the system may determine that the activity request 20 is associated with a security event based on determining that the activity request 20 involves overutilization of the user's resources within an expedited timeframe, e.g., indicating unauthorized misappropriation of the resources. As yet another non-limiting example, the system may determine that the activity request 20 is associated with a security event based on determining that the associated resources/user has been associated with security events whose number exceeds a predetermined threshold within a particular preceding time interval. As yet another non-limiting example, the system may determine that the activity request 20 is associated with a security event based on determining that the activity request involves an outgoing resource transfer that exceeds a predetermined maximum threshold.

In response, the network security system 106 may transmit an escalate authentication and block signal 24 to an entity system 180 associated with the resource, to cause the entity system 180 to escalate, in real-time, a level of authentication required for executing the request 20, such that processing the request 20 is blocked/ceased for at least a first time interval. Specifically, the system stops the activity request 20 from being executed, i.e., prevents the activity 222b associated with the resource A 222 from being performed via the device channel A. Here, escalation of the required authentication involves escalating the level of authentication required for the foregoing activity request above/beyond/higher than the level of authentication of the authentication credentials provided along with or for the activity request. For instance, the activity request 20 may be associated with a medium level of authentication involving a username-password pair based authentication. Continuing with this example, the system may escalate the required authentication to a higher level of authentication involving requiring a separate additional authentication response from the authorized user via another separate network device/communication channel (e.g., one that was previously authorized). The system may also present the required escalated authentication requirement to the user on the separate network device/communication channel, and trigger presentation of a request for the separate additional authentication response to the user.

Next, the network security system 106 may then construct one or more tiered adaptive mitigation actions 26 based on at least the activity data. Here, typically, the one or more tiered adaptive mitigation actions comprise de-escalating (i) an action tier, (ii) a resource tier, and/or (iii) a device tier associated with the first activity. The tiered adaptive mitigation operations are tailored to the activity data associated with the activity request in a manner specific to target the attributes of the unauthorized activity. Moreover, the tiered adaptive mitigation operations may be implemented across a variety of channels, e.g., other channels not associated with the activity request 20, thereby proactively safeguarding a variety of the user's data/resources from current and future unauthorized activities. Moreover, the adaptive mitigation operations are not merely a universal block, but feature a tiered, cascaded or specific attribute-by-attribute approach to implementing preventative actions. Here, the system may analyze the activity data to determine related resources, devices, and/or the like and further construct and tailer mitigation actions thereto. For example, for an activity request 20 involving a request for an outgoing resource transfer of a certain amount (activity tier 222b) from a checking account (resource A 222) via an online resource/banking interface via a computing device (device channel A), the system may determine that the checking account (resource A 222) or the user is associated with payment instrument (e.g., credit card) which is also associated with a digital wallet (resource N) with resource/payment credential tokens (activity tiers 226a, 226b) stored on a mobile device of the user (device channel N). Here, the system may construct the adaptive mitigation operation to send a control signal to the mobile device of the user (device channel N) to deactivate or terminate or remove the particular resource/payment credential tokens (activity tiers 226a, 226b) stored at the digital wallet (resource N), while still allowing the functioning of other tokens thereon (activity tier 226*n*), thereby implementing a cascaded tiered partial suspension/block. Continuing with the above example, while the system may escalate the required authentication level for the activity request 20 thereby at least temporarily blocking/stopping the outgoing resource transfer of the certain amount (activity tier 222*b*) from the checking account (resource A 222) via an online resource/banking interface via a computing device (device channel A), the system may still allow other actions/activities whose authentication level is below the escalated authentication requirement level, e.g., incoming resource transfers (activity tier 224*a*), previously authorized scheduled activities such as automated bill payment (activity tier 224*b*), etc., that are associated with another account (resource B 224) (or associated with resource A itself), further demonstrating the tiered partial suspension/block.

The network security system 106 and the entity system 180 may trigger the auxiliary entity system(s) 195 to implement the one or more tiered adaptive mitigation actions 28, which may in turn provide success/failure signals 30 and 32 to the network security device 106. As discussed, the network security system 106 is structured for cross-channel network security, such that the tiered adaptive mitigation actions not only target the attributes/tiers associated with the activity request 20, but also other channels/tiers. Continuing with the non-limiting example illustrated by FIG. 2, the tiered adaptive mitigation actions not only target the resource A 222 and activity tier 222*b* associated with the request 20, but other pertinent tiers such as resource N 226, activity tiers 226*a*-*b*, and activity tiers 222*a*-222*n* and device channel N as well, which conventional systems may deem irrelevant event though the detected security event may also adversely affect them. Subsequently, in response to determining an authorization validation status of the activity data, the network security system 106 may continue the one or more tiered adaptive mitigation actions and/or trigger a security proceed signal.

As discussed above, the network security system 106 may transmit an escalate authentication and block signal 24 to an entity system 180 associated with the resource, to cause the entity system 180 to escalate, in real-time, a level of authentication required for executing the request 20, such that processing the request 20 is blocked/ceased for at least a first time interval. Specifically, the system stops the activity request 20 from being executed, i.e., prevents the activity 222*b* associated with the resource A 222 from being performed via the device channel A. The system may also present the required escalated authentication requirement to the user on the separate network device/communication channel, and trigger presentation of a request for the separate additional authentication response to the user. Upon successful validation of the additional authentication response at the escalated authentication level, the system 106 may transmit a security proceed signal to the entity system 180 and/or auxiliary system 195, causing the block (e.g., partial block or suspension) of the resource A 222 to be lifted and/or the mitigation actions to be stopped/lifted. On the other hand, following an unsuccessful validation of the additional authentication response, the system may continue the implementation of the mitigation actions, and/or the block (e.g., partial block or suspension) of the resource A 222.

FIG. 3 schematically depicts a high-level process flow 300 for cross-channel network security with tiered adaptive mitigation operations, in accordance with one embodiment of the present invention. The process flow 300 is directed to, in general, dynamic detection of security events associated with network devices and resources, and triggering real-time mitigation operations across a plurality of resource channels. The functions and features described herein may be performed, at least in part, by the network security system 106 via the network security application 144, in some embodiments. In this regard, the system may receive, from a first network device, a request to execute a first activity via a first activity channel, as illustrated by block 302. Typically, the first activity is associated with a first resource. The user activity may comprise one or more actions/tasks/activities associated with the first resource associated with an entity or a financial institution described previously. In this regard, the user may employ a user device 104, (e.g., a mobile device or another computing device) to perform an electronic activity (e.g., in which the user interacts with an entity/merchant system). For example, the user may access and/or perform another activity (e.g., transfer funds) using an online banking account at a financial institution. By way of further example, the user may perform a mobile wallet transaction. As another example, the user may purchase goods or services using a bank account at a financial institution. In some embodiments, the request comprises the user accessing or opening an application associated with the activity, via the user mobile device. For example, the user opening a mobile banking application to view account balances or opening a page within the application to modify account preferences. Typically, the system establishes an operative communication link with the mobile device of the user, and the request is received via this communication link.

Typically, execution of the user activity requires validation of one or more authentication credentials, based on the type of activity. In this regard, the user activity may be associated one or more authentication credentials related to an existing level of authentication. For example, a user activity comprising accessing a mobile device application may be require authentication using a username and password. The credentials of username and password may be associated with a first. low level of authentication. As another example, another user activity comprising initiating a purchase using a user application may require credentials with a second, higher level of authentication, for example payment instrument identifiers and their associated personal identification numbers (PIN). However, these credentials may be obtained by unauthorized individuals. However, the existing level or authentication, associated with the activity itself, may not be satisfactory in instances where the user may be potentially exposed to misappropriation or in instances where chances of unauthorized access to the user's personal and financial information is heightened. With electronic activities becoming ubiquitous, the technological parameters associated with the user activity or the situational instance of the user activity, like the method of conducting the activity (online, mobile, purchase transactions using tokens, card present transaction, and the like), the technical aspects of the device used to conduct the activity (network connections, stored applications, authentication features), physical location of the user activity, merchants and other entities that gain access to user's financial/personal information (in both electronic and physical forms) in the course of the activity, influence the security and assurance in the user activity. Since the methods and modes of intercepting personal information and exposure in electronic activities are greater in number and technically varied, in comparison with non-electronic transactions like payment with cash/currency, there is a need for effective systems to safeguard personal and financial information and to mitigate exposure of electronic activities. The present invention provides a novel solution configured to dynamically assess the network security, based on the both the type of the user activity and the technological parameters/situational instance of the user activity, in real-time, to ensure security and safety of the user's financial and personal information. For example, the system may determine that conducting a first user activity in an unsecured/unknown wireless communication area may potentially adversely affect the security of the user's personal information. In such instances, the system may escalate, in real-time, the required level of authentication from the existing level (for example, a passcode) to an additional authentication response at a higher level (for example, a fingerprint scan) for executing the user activity as long as the parameters associated with the activity deem to require such. Continuing with the example, for the first user activity, the system may escalate the authentication level from a first level to a higher second level as long as the user is in the vicinity of the unsecure wireless communication area and then reduce the authentication level back to the first level when the user is in secure/known wireless communication area like the user's home or within the premises of a financial institution, to expedite the process. In some embodiments, the system may determine that escalation of the level of authentication for a certain user activity is required based on historical exposure events as described in detail below. In some embodiments, the system may deny/decline the request to execute a user activity based on the congruence of the technological parameters/situational instance of the user activity and certain historical exposure events, to safeguard personal information.

Here, the system may extract and analyze activity data regarding the first network device and the first resource. The system 106 may then extract activity data regarding the first network device and the first resource. The activity data may comprise technology attribute/tier data associated with the activity request, user information provided by the user, historical user activity logs, and/or the like. In some embodiments, extracting activity data regarding the first network device and the first resource comprises at least constructing the relevant technology attribute/tier data associated with the activity request. As discussed above, the activity request is typically associated with a plurality of technology attributes, e.g., one or more of (i) an action tier technology attribute, (ii) a resource tier attribute technology attribute, and/or (iii) a device tier attribute technology attribute. In other words, the activity request is transmitted from a particular device associated with a particular device/communication channel (e.g., device tier) associated with performing a particular action (e.g., an action tier) on one or more resources (e.g., a resource tier).

The network security system may then analyze, dynamically and in real-time, activity data regarding the activity request 20, e.g., the associated originating device channel, resource, activity, etc. Here, the network security system may analyze the activity data, dynamically and in real-time, to determine whether the activity request is associated with an exposure event or security event (e.g., associated with an existing exposure event, a potential future exposure event, etc.) and to determine how to prevent the exposure event from occurrence or completion so that the user's data and resources are not adversely affected therefrom. Next, as indicated by block 304, the system may escalate, in real-time, a level of authentication required for executing the first activity via the first activity channel based on determining that (i) the first activity is associated with a security event, and/or (ii) the first network device is associated with a negative security device, such that processing of the first activity via the first activity channel is ceased for a first time interval at least until a security proceed signal is determined. Here, the system may prevent check-out, dissuade viewing/access of personal information, lock the display screen of the device or otherwise suspend certain functionality associated with the merchant application and/or the mobile device, at least until the security proceed signal is determined, until the requirement of escalated authentication based on situational instance is ascertained and/or authentication credentials associated with escalated levels of authentication are validated. In this regard, the system may be overarching and may be configured to control one or more applications, operating system, user interface and other functionality associated with the user mobile device, based on receiving prior authorization from the user.

In some embodiments, determining that the first network device is associated with a negative security device comprises analyzing the activity data comprising device information associated with the first network device. Here the system may identify the mobile device and/or the user associated with the mobile device. The mobile device may be identified by gathering device identification information from the mobile device to generate the device's "fingerprint," or unique signature of the mobile device. Device identification information may be collected from a variety of sources. In some embodiments, the device identification information includes an identification code. The identification code may be but is not limited to a serial number or an item number of the device. In some embodiments, the device identification information may be associated with a chip associated with the mobile device. The chip may be but is not limited to a subscriber identification module (SIM) card, removable hard drive, processor, microprocessor, or the like. In other embodiments, the device identification information may be associated with a removable part of the mobile device. Removable parts include but are not limited to detachable keyboards, battery covers, cases, hardware accessories, or the like. Removable parts may contain serial numbers or part numbers. In alternative embodiments, a unique key, code, or piece of software provided by the system may be downloaded onto the mobile device. This unique key, code, or piece of software may then serve as device identification information. In some embodiments, and in combination with any of the previous embodiments, determining that the first network device is associated with a negative security device comprises scanning a predetermined memory location of the first network device. Here, the system may determine that (i) the predetermined memory location of the first network device does not comprise a stored device authentication token (e.g., indicating a device fingerprint), or that (ii) a stored device authentication token at the predetermined memory location is not active.

In some embodiments, the system may continuously monitor the situational instance associated with the user activity, to provide dynamic assessment of authentication requirements. Monitoring the situational instance may comprise ascertaining the technological security parameters associated with the user activity, comprising at least user network connections, user location and user applications. Monitoring the user network connections, typically comprises identifying at least one local network that the mobile device is currently connected to and determining one or more local devices in communication with the local network. Monitoring the user applications comprises determining one or more applications stored on the mobile device and determining activities of the one or more applications.

Monitoring the user location may comprise determining the current physical location of the user mobile device.

In some embodiments, determining that the first network device is associated with a negative security device comprises analyzing the activity data comprising device information associated with the first network device. Here, the system may identify at least one local network that the first network device is n communication with, e.g., based on the device information. Subsequently, the system may determine that (i) the at least one local network, (ii) one or more local devices in communication with the at least one local network, and/or (iii) one or more stored applications of the first network device, are associated with a predetermined security event (e.g., previously identified to be unsecure, associated with prior exposure events, etc.).

In some embodiments, the historical exposure events may be similar to the user activities described previously that have been identified to be associated with exposure or misappropriation. In some embodiments, a secondary user may provide information regarding the network connections, locations, applications and/or merchants associated with an exposure event related to a secondary user account. For example, the secondary user may provide information associated with an exposure event comprising a repeat billing for a purchase made through a first application stored on the secondary user device, which was not resolved by the associated merchant. In this regard, the system may flag the merchant and/or the first application as having higher exposure. In some embodiments, the system may identify the situational instance of an exposure event indicated by a user. As another example, another secondary user may indicate exposure event comprising interception of the user's personal information resulting in unauthorized access to a social media account of the user. The system may then retrieve network connection history and activity history of one or more secondary user devices, based on receiving the appropriate credentials from the user, and then identify that the user initiated a social media session by providing login credentials using an unsecure/unknown wireless network as a certain time, that is different from the user's known/trusted networks. The system may then determine a situational attribute for the exposure event comprising a network identifier associated with the unsecure network.

In some embodiments, repeated flags for a particular network device, resource, etc. associated with the first activity request, may cause the system to identify the particular first activity to be associated with a security event. Here, the system may analyze the activity data comprising resource information associated with the first resource and one or more related second resources. Next, the system may determine that one or more prior predetermined security events associated with the first resource and/or the one or more related second resources exceed a predetermined threshold. In some embodiments, determining that the first network device is associated with a negative security device comprises determining that the first activity channel (e.g., WAN, LAN, etc.) of the first activity is associated with a predetermined security event.

The system may then store the received activity data in a structured secured database. In this regard, the system may transform the data may transform the activity data into a suitable file format, encode/encrypt the data/files in such a way that the plaintext is available only to the authorized system with a specific decryption key. This centralized repository may be updated, continuously and in real-time, as activity data regarding historical exposure events is received, to ensure that the information is current. Although termed as historical, the exposure events may be associated with current exposure events identified in real-time or near real-time, recent exposure events conducted/identified hours or days prior to the current time, or older exposure events conducted/identified weeks, months or years prior to the current time.

Based on monitoring the user network connections, user location and user applications associated with the sure activity, the system may extract or retrieve activity data regarding historical exposure events. In some embodiments, the system may extract only the activity data pertaining to those historical events that are identical/similar to the user-initiated activity, to improve processing speed, reduce temporary/cache storage requirements and for quicker perusal. For example, historical events in the same state or city of the user, historical events associated a mobile device type (for example, based on the model or the operating system of the device), historical events within a predetermined time period, historical events with a similar type of user activity (for example, online transactions, or transactions using a specific mobile application, transactions associated with an entity), and the like. However, in other embodiments, the system may retrieve and/or parse activity data concerning all known exposure events.

The system may then escalate the level of authentication required for the user to execute the user activity based on determining that at least one of the (i) user network connections, (ii) user location and/or (iii) user applications are associated with at least one historical exposure event. In this regard, the system may identify the current authentication requirements or authentication level required, for the user to execute the activity. The system may ascertain the escalated higher authentication level required based on the identified at least one historical exposure event that has similar situational instance as the user activity. Alternately, in some embodiments, the system may limit the permissible functions for the given level of authentication based on determining that the situational attributes are associated with historical exposure events. For example, the system may only allow the user to view account balances, but may block payments/transactions based on determining that the user location is associated with a location with known incidents of exposure, for as long as the user is at that location.

Typically, the user authentication is associated with multiple, predetermined levels of authentication, based on the functions that are permitted for the given authentication level. For example, a lowest level of authentication may be satisfactory to execute certain functions/activities like opening an application, viewing predetermined content and the like. A higher level of authentication may be required for other functions like modifying content, performing purchases. Typically, the level of authentication may be associated with one or more types of authentication credentials. For example, a low level of authentication may be associated with authentication credential types like a passcode, a swipe gesture, or no requirement for credentials at all. A moderate level of authentication may be associated with authentication credentials types like a username accompanied by an alphanumeric password, an account identifier along with an expiration date and the like. A high level of authentication may be associated with authentication credential types like biometric information (fingerprint scans, iris scans/facial recognition, voice recognition and the like), username accompanied by a one-time passcode generated/provided on another linked user device and the like. In some embodiments, the authentication level may be escalated using a combination of the authentication credential types. For example, the authentication level of a username-passcode authentication may be increased to a higher level with the user providing additional out of wallet credentials like predefined security questions, user contact information, identification information and the like. There may be multiple levels of authentication (3, 10, 15, or the like), with each level being associated with a numeric, alphabetic, visual or another suitable identifier.

The system ascertains the escalated authentication level based on at least the attributes associated with the historical exposure events determined to have similar situational instances as the user activity. The attributes of the exposure events determined to have similar situational attributes may comprise the number events, frequency of occurrence of events, significance of the event (type of exposure, type of data involved, amount of funds involved and the like), times of occurrence and other similar attributes. For example, a user activity may be associated with an authentication level A. Based on determining that the user activity is associated with a network determined to have a predetermined large number exposure events frequently, the system may escalate the required authentication to a higher level C. Alternately, based on determining that the user activity is associated with a network determined to have only one such exposure event and determined to have occurred before a predetermined time period (for example, a year), the system may escalate the required authentication to a higher level B. In this regard, the authentication level C may be higher than the authentication level B. In some embodiments, the system may require the escalated level of authentication only as long as the user activity is associated with the situational instance determined to be similar to historical exposure events, so that the user is not subjected to undue delays or inconvenience when not deemed necessary.

As discussed previously, as a part of the escalation of the authentication level, the system stops the first activity from being executed, i.e., prevents the activity associated with the first resource from being performed via the first activity channel. Here, escalation of the required authentication involves escalating the level of authentication required for the foregoing activity request above/beyond/higher than the level of authentication of the authentication credentials provided along with or for the activity request. For instance, the first activity request may be associated with a medium level of authentication involving a username-password pair based authentication. Continuing with this example, the system may escalate the required authentication to a higher level of authentication involving requiring a separate additional authentication response from the authorized user via another separate network device/communication channel (e.g., one that was previously authorized). The system may also present the required escalated authentication requirement to the user on the separate network device/communication channel, and trigger presentation of a request for the separate additional authentication response to the user.

Next, the system may construct one or more tiered adaptive mitigation actions based on at least the activity data, wherein the one or more tiered adaptive mitigation actions comprise de-escalating (i) an action tier, (ii) a resource tier, and/or (iii) a device tier associated with the first activity, at block 306. Next, at block 308, the system may trigger, in real-time, initiation of the one or more tiered adaptive mitigation actions, prior to the first activity via the first activity channel to prevent security exposure associated with the first activity. The tiered adaptive mitigation operations are tailored to the activity data associated with the activity request in a manner specific to target the attributes of the unauthorized activity. Moreover, the tiered adaptive mitigation operations may be implemented across a variety of channels, e.g., other channels not associated with the activity request 20, thereby proactively safeguarding a variety of the user's data/resources from current and future unauthorized activities. Moreover, the adaptive mitigation operations are not merely a universal block, but feature a tiered, cascaded or specific attribute-by-attribute approach to implementing preventative actions. Here, the system may analyze the activity data to determine related resources, devices, and/or the like and further construct and tailer mitigation actions thereto.

In some embodiments, the one or more tiered adaptive mitigation actions comprise de-escalating the resource tier. Here, the system may determine one or more second resources associated with the first resource, and implement a block on the one or more second resources such that execution of one or more second activities associated with the one or more second resources is prevented. For example, as illustrated in FIG. 2, for an activity request 20 involving a request for an outgoing resource transfer of a certain amount (activity tier 222*b*) from a checking account (resource A 222) via an online resource/banking interface via a computing device (device channel A), the system may determine that the checking account (resource A 222) or the user is associated with payment instrument (e.g., credit card) which is also associated with a digital wallet (resource N) with resource/payment credential tokens (activity tiers 226*a*, 226*b*) stored on a mobile device of the user (device channel N). Here, the system may construct the adaptive mitigation operation to send a control signal to the mobile device of the user (device channel N) to deactivate or terminate or remove the particular resource/payment credential tokens (activity tiers 226*a*, 226*b*) stored at the digital wallet (resource N), while still allowing the functioning of other tokens thereon (activity tier 226*n*), thereby implementing a cascaded tiered partial suspension/block.

In some embodiments, the one or more tiered adaptive mitigation actions comprise de-escalating the action tier. Here, the system may implement a partial block of the first resource such that the first activity associated with the first resource is blocked. The system may further receive a request to execute a second activity associated with the first resource. The system may process the second activity in response to determining that the second activity has a level of authentication below a predetermined threshold. Continuing with the above example, while the system may escalate the required authentication level for the activity request 20 thereby at least temporarily blocking/stopping the outgoing resource transfer of the certain amount (activity tier 222*b*) from the checking account (resource A 222) via an online resource/banking interface via a computing device (device channel A), the system may still allow other actions/activities whose authentication level is below the escalated authentication requirement level, e.g., incoming resource transfers (activity tier 224*a*), previously authorized scheduled activities such as automated bill payment (activity tier 224*b*), etc., that are associated with another account (resource B 224) (or associated with resource A itself), further demonstrating the tiered partial suspension/block.

In another embodiment, and in combination with any of the previous embodiments, the one or more tiered adaptive mitigation actions comprise de-escalating the device tier. Here, the system may implement a block of the first activity channel such that the first activity associated with the first resource is blocked. Subsequently, upon receiving a request to execute another second activity via the same first activity channel, the system may prevent processing of the second activity via the first activity channel. For instance, the request for the first activity may be provided at a first mobile device. The system may then block one or more subsequent activities originating from the first mobile device.

As discussed above, the system may escalate, in real-time, a level of authentication required for executing the first activity, such that its processing is blocked/ceased for at least a first time interval. In this regard, the system may also request one or more credentials determined to be associated with the escalated authentication level. Here, the system may determine a second activity channel associated with the user, i.e., a previously authenticated user device. The system may then transmit the escalated authentication level to the user via the second activity channel, and present a request for the user to provide an additional escalated authentication response at the escalated authentication level (e.g., a biometric credential, a response from a predetermined secure application of the mobile device, a cellular message, etc.). As described previously, the system may block functionality associated with the mobile phone, until (i) successful validation of additional escalated authentication response received from the user and/or (ii) the situational instance of the user activity is no longer associated with historical exposure events. The system may then receive the additional escalated authentication response via the second activity channel. The system may then analyze the additional escalated authentication response to determine whether it is valid, i.e., the authorization validation status of the activity data.

In response to determining an authorization validation status of the activity data, the system may continue the one or more tiered adaptive mitigation actions and/or trigger the security proceed signal, at block 310. Specifically, upon successful validation of the additional escalated authentication response at the escalated authentication level, the system may trigger the security proceed signal causing the block (e.g., partial block or suspension) of the first resource (described with respect to block 304) to be lifted and/or the implemented mitigation actions (described with respect to blocks 306-308) to be stopped/lifted. On the other hand, following an unsuccessful validation of the additional escalated authentication response, the system may continue the implementation of the mitigation actions (described with respect to blocks 306-308).

Based on determining that (i) the user is currently in the physical area associated with a historical exposure event and/or (ii) the user's current security features do not meet the escalated level of authentication required for the predefined physical area, the system may lock/disable one or more features of the user mobile device. The system may unlock/enable the features, automatically, in response to determining that the preceding conditions (i) and/or (ii) are no longer valid. For example, the system may freeze the display screen with a display of the dynamic exposure map, thereby prohibiting the use of the device within the unsecure area. As another example, the system may temporarily disable one or more applications/widgets on the user's mobile device and/or restrict transfer of data to and from the device. As another example, the system may limit the type of activities that may be performed using the mobile device in the physical area, by not allowing online purchases, changes in passwords/login information for applications and the device itself, installation of new applications and/or activation/deactivation of existing applications.

As alluded to previously, the user is typically required to authenticate their identity in order to complete a user activity (e.g., an electronic transaction). Numerous types and levels of user authentication exist. For example, a user may authenticate their identity using a unique alias such as a username and/or password. Further, in some situations, challenge questions, familiar pictures and/or phrases, biometrics, key fob-based alphanumeric codes and/or collocation, authentication of another application such as a similar application or an "overarching" application, and/or the like may be used as types of identity authentication. In some embodiments, the identity of the device being used by the user may be used to authenticate the identity of the user. The different types of authentication may provide differing degrees of confidence regarding the authentication using such types and thereby provide different levels of authentication. For example, if a username by itself is used for a first user authentication, and a username along with a password is used for a second authentication, then the second authentication should provide a higher confidence regarding the authentication because of the additional layer of authentication required. Therefore the second authentication is at a higher authentication level. Further, within the types of authentication, varying levels of confidence may be used. For example, when using a password, an administrator may require users to create a password according to strict rules designed to increase the security level of the password, and therefore increase the confidence/level of any authentication using the password.

Accordingly, a continuum of authentication may be used to quantify (or dictate) the levels of authentication. Likewise, a continuum of functions permitted may be used to quantify (or dictate) the number or context in which functions (e.g., types of activities) are permitted.

Referring to FIG. 4A, a continuum of authentication 400A is illustrated according to embodiments of the invention. On the left-hand side of the continuum, a "zero authentication"/lowest level of authentication requires no authentication credentials. On the right-hand side of the continuum, a "hard authentication"/highest level of authentication requires full authentication credentials. This means that it requires the strictest combination of credentials. In between the two extremes, "a soft authentication" requires minimal credentials, moderate credentials or most credentials for various points along the continuum. The continuum generally represents the number of credentials required and/or the relative strength of the credentials required for that point on the continuum. As discussed below with reference to FIG. 4C, the continuum of authentication 400A may be coupled with a functions permitted continuum 400B, first illustrated in FIG. 4B.

Referring to FIG. 4B, the functions permitted continuum 400B illustrates various levels of functions (e.g., electronic activities) permitted. Functions may refer to what a user is permitted to "see" and/or what the user is permitted to "do". More specifically, this may refer to whether a specific function is permitted at a certain point on the continuum and/or the context in which a certain function is permitted. The left-hand side of the continuum indicates that no functions are permitted, and the right-hand side of the continuum indicates that all functions are permitted. In between the extremes, minimal functions are permitted, moderate functions are permitted and most functions are permitted. Thus, any given point along the continuum 400B corresponds with a certain amount and/or number of functions that are permitted and/or the context in which certain functions are permitted.

Referring now to FIG. 4C, a diagram 400C illustrates a coupling of the functions permitted continuum 400B and the levels of authentication continuum 400A. As shown, the continua 400B and 400A may be coupled with one another such that the various points along the continua intersect at specific points of the coupled continuum. For example, one continuum may be moved left or right with respect to the other continuum in order to achieve a different relationship between the functions permitted and the credentials required. Accordingly, for a given coupling, a specific point on continuum 400B provides that a particular function or functions may be permitted given that a specified level of authentication credentials are supplied, as indicated by the corresponding point on continuum 400A. For example, the system, a financial institution and/or a user may arrange the continua 400B and 400A with respect to one another and may adjust the arrangement based on changing desires or goals and situational instance with respect to historical exposure events.

In some embodiments, one or both the continua 400B and 400A may have weighted scales such that, as a point on the continuum is moved, the corresponding functions permitted and/or level of authentication required may change exponentially or otherwise. Furthermore, in various embodiments, other representations of the various functions permitted that correspond with the various levels of authentication may be used by the invention. As noted, the level of authentication required to complete an electronic activity may be increased or decreased based on: (i) the user network connections, (ii) the user applications, and/or (iii) the user location with respect to historical exposure events. For example, if the user is typically required to provide a username and password to complete a type of activity, in accordance with block 310, then the user may be prompted to provide additional (e.g., secondary) authentication information, a text message confirmation via a cellular communication channel.

Referring now to FIG. 4D, a diagram 400D illustrates a relationship between the functions permitted and the authentication types. As shown in FIG. 4D, the soft authentication continuum between zero authentication and hard authentication may include one or more authentication types (A, B, C in the Figure). In one aspect, the one or more authentication types corresponding to the one or more authentication credentials received from the user and one or more functions are positively correlated. In one aspect, the user may have to provide authentication credentials corresponding to authentication types A and B to perform moderate functions. In another aspect, the user may have to provide authentication credentials corresponding to authentication types A, B, and C to perform most functions. In yet another aspect, the user may have to only provide authentication credentials corresponding to authentication type A to perform minimal functions. For example, a username may enable the user to gain access to checking balance via an online banking application, a username and password may enable the user to gain access to checking balance, funds transfer between the user's first bank account and second bank account, and downloading previous statements, and a username, password and challenge question may enable the user to gain complete access to all the functions of an online banking transaction. By way of further example, the user may need to provide the zip code associated with the user's account in order for the user to complete a mobile wallet transaction that exceeds a defined threshold.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for cross-channel network security with tiered adaptive mitigation operations, wherein the system is structured for dynamic detection of security events associated with network devices and resources, and triggering real-time mitigation operations across a plurality of resource channels, the system comprising:
   at least one memory device;
   at least one communication device connected to a distributed network;
   at least one processing device operatively coupled to the at least one memory device; and
   a module stored in the at least one memory device comprising executable instructions that when executed by the at least one processing device, cause the at least one processing device to:
      receive, from a first network device, a request to execute a first activity via a first activity channel, wherein the first activity is associated with a first resource;
      extract activity data regarding the first network device and the first resource;
      escalate, in real-time, a level of authentication required for executing the first activity via the first activity channel based on determining that (i) the first activity is associated with a security event, and (ii) the first network device is associated with a predetermined security device, wherein escalating the level of authentication further comprises:
         determining that a user associated with the first network device is currently in a first physical area associated with a historical exposure event, comprising:
            determining a successful authentication of biometric credentials associated with the user within a predetermined time interval preceding the request to execute the first activity;
            determining a first geographic location associated with the input of the biometric credentials;
            constructing a distance range from the first geographic location based on determining travel time between the first geographic location and the first physical area associated with the first activity channel, based on, at least, local travel restrictions preventing the user's arrival at the first physical area; and
            determining that the first physical area is outside the distance range;
         disabling one or more features of the first network device, comprising freezing a display screen associated with the first network device when the first network device is in the first physical area and prohibiting transfer of data to and from first network device when the first network device is in the first physical area;
         blocking completion of the first activity via the first activity channel for a first time interval at least until a security proceed signal is determined;
         presenting a determined escalated authentication requirement on a second network device; and
         presenting, via the second network device, a request for an additional authentication response;
      construct one or more tiered adaptive mitigation actions based on at least the activity data, wherein the one or more tiered adaptive mitigation actions comprise de-escalating (i) an action tier, (ii) a resource tier, and/or (iii) a device tier associated with the first activity;
      trigger, in real-time, initiation of the one or more tiered adaptive mitigation actions, prior to the first activity via the first activity channel to prevent security exposure associated with the first activity, comprising:
         implementing a first block of the first resource such that the first activity associated with the first resource is blocked, wherein the first block is an adapted partial block;

receiving a request to execute a second activity associated with the first resource; and allowing the second activity associated with the blocked first resource in response to determining that the second activity has a level of authentication below a predetermined threshold;

in response to determining an authorization validation status of the activity data, continue the one or more tiered adaptive mitigation actions and trigger the security proceed signal;

remove the block to the completion of the first activity via the first activity channel; and unlock the one or more disabled features of the first network device.

2. The system of claim 1, wherein determining that the first network device is associated with a predetermined security device comprises:

analyzing the activity data comprising device information associated with the first network device;

identifying at least one local network associated with the first network device based on the device information, wherein the first network device is in communication with the at least one local network during the first activity; and determining that (i) the at least one local network, (ii) one or more local devices in communication with the at least one local network, and/or (iii) one or more stored applications of the first network device, are associated with a predetermined security event.

3. The system of claim 1, wherein determining that the first network device is associated with a predetermined security device comprises:

scanning a predetermined memory location of the first network device; and determining that (i) the predetermined memory location of the first network device does not comprise a stored device authentication token, or that (ii) a stored device authentication token at the predetermined memory location is not active.

4. The system of claim 1, wherein determining that the first network device is associated with a predetermined security device comprises determining that the first activity channel of the first activity is associated with a predetermined security event.

5. The system of claim 1, wherein determining that the first activity is associated with a security event comprises:

analyzing the activity data comprising resource information associated with the first resource and one or more related second resources; and determining that one or more prior predetermined security events associated with the first resource and/or the one or more related second resources exceed a predetermined threshold.

6. The system of claim 1, wherein initiating the one or more tiered adaptive mitigation actions further comprises:

determining that the first resource is associated with a digital wallet application at a mobile device associated with the user;

transmitting a control signal to the digital wallet application at the mobile device; and removing one or more credential tokens associated with the first resource from the digital wallet application at the mobile device.

7. The system of claim 1, wherein the one or more tiered adaptive mitigation actions comprise de-escalating the resource tier, wherein initiating the one or more tiered adaptive mitigation actions further comprises:

determining one or more second resources associated with the first resource; and implementing a block on the one or more second resources such that execution of one or more second activities associated with the one or more second resources is prevented.

8. The system of claim 1, wherein the one or more tiered adaptive mitigation actions comprise de-escalating the device tier, wherein initiating the one or more tiered adaptive mitigation actions further comprises:

implementing a block of the first activity channel such that the first activity associated with the first resource is blocked;

receiving a request to execute a second activity via the first activity channel; and preventing processing of the second activity via the first activity channel.

9. A computer program product for cross-channel network security with tiered adaptive mitigation operations, whereby the computer program product is structured for dynamic detection of security events associated with network devices and resources, and triggering real-time mitigation operations across a plurality of resource channels, the computer program product comprising a non-transitory computer-readable storage medium having computer-executable instructions to:

receive, from a first network device, a request to execute a first activity via a first activity channel, wherein the first activity is associated with a first resource;

extract activity data regarding the first network device and the first resource;

escalate, in real-time, a level of authentication required for executing the first activity via the first activity channel based on determining that (i) the first activity is associated with a security event, and (ii) the first network device is associated with a predetermined security device, wherein escalating the level of authentication further comprises:

determining that a user associated with the first network device is currently in a first physical area associated with a historical exposure event, comprising:

determining a successful authentication of biometric credentials associated with the user within a predetermined time interval preceding the request to execute the first activity;

determining a first geographic location associated with the input of the biometric credentials;

constructing a distance range from the first geographic location based on determining travel time between the first geographic location and the first physical area associated with the first activity channel, based on, at least, local travel restrictions preventing the user's arrival at the first physical area; and determining that the first physical area is outside the distance range;

disabling one or more features of the first network device, comprising freezing a display screen associated with the first network device when the first network device is in the first physical area and prohibiting transfer of data to and from first network device when the first network device is in the first physical area;

blocking completion of the first activity via the first activity channel for a first time interval at least until a security proceed signal is determined;

presenting a determined escalated authentication requirement on a second network device; and
presenting, via the second network device, a request for an additional authentication response;
construct one or more tiered adaptive mitigation actions based on at least the activity data, wherein the one or more tiered adaptive mitigation actions comprise de-escalating (i) an action tier, (ii) a resource tier, and/or (iii) a device tier associated with the first activity;
trigger, in real-time, initiation of the one or more tiered adaptive mitigation actions, prior to the first activity via the first activity channel to prevent security exposure associated with the first activity, comprising:
implementing a first block of the first resource such that the first activity associated with the first resource is blocked, wherein the first block is an adapted partial block;
receiving a request to execute a second activity associated with the first resource; and
allowing the second activity associated with the blocked first resource in response to determining that the second activity has a level of authentication below a predetermined threshold;
in response to determining an authorization validation status of the activity data, continue the one or more tiered adaptive mitigation actions and trigger the security proceed signal;
remove the block to the completion of the first activity via the first activity channel; and
unlock the one or more disabled features of the first network device.

10. The computer program product of claim 9, wherein determining that the first network device is associated with a predetermined security device comprises:
analyzing the activity data comprising device information associated with the first network device;
identifying at least one local network associated with the first network device based on the device information, wherein the first network device is in communication with the at least one local network during the first activity; and
determining that (i) the at least one local network, (ii) one or more local devices in communication with the at least one local network, and/or (iii) one or more stored applications of the first network device, are associated with a predetermined security event.

11. The computer program product of claim 9, wherein determining that the first network device is associated with a predetermined security device comprises:
scanning a predetermined memory location of the first network device; and
determining that (i) the predetermined memory location of the first network device does not comprise a stored device authentication token, or that (ii) a stored device authentication token at the predetermined memory location is not active.

12. The computer program product of claim 9, wherein determining that the first network device is associated with a predetermined security device comprises determining that the first activity channel of the first activity is associated with a predetermined security event.

13. The computer program product of claim 9, wherein determining that the first activity is associated with a security event comprises:
analyzing the activity data comprising resource information associated with the first resource and one or more related second resources; and
determining that one or more prior predetermined security events associated with the first resource and/or the one or more related second resources exceed a predetermined threshold.

14. The computer program product of claim 9, wherein initiating the one or more tiered adaptive mitigation actions further comprises:
determining that the first resource is associated with a digital wallet application at a mobile device associated with the user;
transmitting a control signal to the digital wallet application at the mobile device; and
removing one or more credential tokens associated with the first resource from the digital wallet application at the mobile device.

15. A method for cross-channel network security with tiered adaptive mitigation operations, whereby the method is structured for dynamic detection of security events associated with network devices and resources, and triggering real-time mitigation operations across a plurality of resource channels, the method comprising:
receiving, from a first network device, a request to execute a first activity via a first activity channel, wherein the first activity is associated with a first resource;
extracting activity data regarding the first network device and the first resource;
escalating, in real-time, a level of authentication required for executing the first activity via the first activity channel based on determining that (i) the first activity is associated with a security event, and (ii) the first network device is associated with a predetermined security device, wherein escalating the level of authentication further comprises:
determining that a user associated with the first network device is currently in a first physical area associated with a historical exposure event, comprising:
determining a successful authentication of biometric credentials associated with the user within a predetermined time interval preceding the request to execute the first activity;
determining a first geographic location associated with the input of the biometric credentials;
constructing a distance range from the first geographic location based on determining travel time between the first geographic location and the first physical area associated with the first activity channel, based on, at least, local travel restrictions preventing the user's arrival at the first physical area; and
determining that the first physical area is outside the distance range;
disabling one or more features of the first network device, comprising freezing a display screen associated with the first network device when the first network device is in the first physical area and prohibiting transfer of data to and from first network device when the first network device is in the first physical area;
blocking completion of the first activity via the first activity channel for a first time interval at least until a security proceed signal is determined;
presenting a determined escalated authentication requirement on a second network device; and
presenting, via the second network device, a request for an additional authentication response;

constructing one or more tiered adaptive mitigation actions based on at least the activity data, wherein the one or more tiered adaptive mitigation actions comprise de-escalating (i) an action tier, (ii) a resource tier, and/or (iii) a device tier associated with the first activity;

triggering, in real-time, initiation of the one or more tiered adaptive mitigation actions, prior to the first activity via the first activity channel to prevent security exposure associated with the first activity, comprising:
   implementing a first block of the first resource such that the first activity associated with the first resource is blocked, wherein the first block is an adapted partial block;
   receiving a request to execute a second activity associated with the first resource; and
   allowing the second activity associated with the blocked first resource in response to determining that the second activity has a level of authentication below a predetermined threshold;

in response to determining an authorization validation status of the activity data, continuing the one or more tiered adaptive mitigation actions and triggering the security proceed signal;

remove the block to the completion of the first activity via the first activity channel; and unlock the one or more disabled features of the first network device.

16. The method of claim 15, wherein determining that first network device is associated with a predetermined security device comprises:
   analyzing the activity data comprising device information associated with the first network device;
   identifying at least one local network associated with the first network device based on the device information, wherein the first network device is in communication with the at least one local network during the first activity; and
   determining that (i) the at least one local network, (ii) one or more local devices in communication with the at least one local network, and/or (iii) one or more stored applications of the first network device, are associated with a predetermined security event.

17. The method of claim 15, wherein determining that the first network device is associated with a predetermined security device comprises:
   scanning a predetermined memory location of the first network device; and
   determining that (i) the predetermined memory location of the first network device does not comprise a stored device authentication token, or that (ii) a stored device authentication token at the predetermined memory location is not active.

18. The method of claim 15, wherein determining that the first network device is associated with a predetermined security device comprises determining that the first activity channel of the first activity is associated with a predetermined security event.

19. The method of claim 15, wherein determining that the first activity is associated with a security event comprises:
   analyzing the activity data comprising resource information associated with the first resource and one or more related second resources; and
   determining that one or more prior predetermined security events associated with the first resource and/or the one or more related second resources exceed a predetermined threshold.

20. The method of claim 15, wherein initiating the one or more tiered adaptive mitigation actions further comprises:
   determining that the first resource is associated with a digital wallet application at a mobile device associated with the user;
   transmitting a control signal to the digital wallet application at the mobile device; and
   removing one or more credential tokens associated with the first resource from the digital wallet application at the mobile device.

* * * * *